Figure 1:
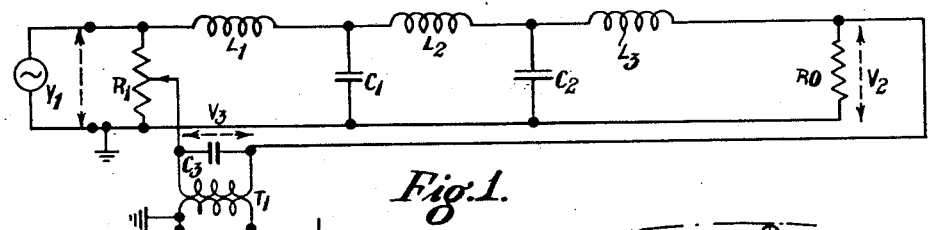

Sept. 2, 1952  L. H. BEDFORD ET AL  2,609,448
ELECTRICAL DIFFERENTIATING CIRCUIT
Filed June 1, 1945

INVENTORS
Leslie H. Bedford
Lionel Jofeh
By Ralph B. Stewart
attorney

Patented Sept. 2, 1952

2,609,448

UNITED STATES PATENT OFFICE 2,609,448

ELECTRICAL DIFFERENTIATING CIRCUIT

Leslie Herbert Bedford and Lionel Jofeh, London, England, assignors to A. C. Cossor Limited, London, England, a British company Application June 1, 1945, Serial No. 597,049
In Great Britain June 7, 1944

5 Claims. (Cl. 178—44)

This invention relates to electrical measuring and calculating apparatus, and in particular to apparatus for evaluating the differential coefficient of a given function.

The purpose of the invention is to produce an alternating voltage which is co-phased with a given alternating voltage of constant frequency and which varies in amplitude in accordance with the rate of change of amplitude of the given voltage.

This object is achieved in the arrangement according to the invention, by producing an alternating voltage co-phased with the given alternating voltage and varying in amplitude in accordance with the amplitude variations of the given voltage, but with a constant time lag. The required alternating voltage is then obtained as the difference between this delayed version of the given voltage and either (a) the given voltage itself, or (b) a delayed version thereof having a smaller constant time lag.

In order that the two voltages to be compared may be co-phased, and if the time delay is applied to both the carrier and the side bands of one of the voltages relatively to the other, the time lag (or difference in time lags if both are delayed) must be equal to a whole number of periods of the applied alternating voltage, or an odd number of half periods if a phase-inverting mechanism is included in the path of one of the voltages. The invention will be more fully appreciated from the following detailed discussion of several embodiments. In the drawings, Figure 1 is a circuit diagram of the preferred form of the invention, and Figures 2 and 3 are wave diagrams showing the operation of Figure 1.

In the arrangement shown in Figure 1 for carrying the invention into effect, the given alternating voltage V1 is applied as input to an artificial line comprising a plurality of inductances L1, L2, L3 in series with each other in one conductor and a plurality of condensers C1, C2 connected between the junctions of these inductances and the other conductor, this line being terminated in a resistance Ro equal in value to the characteristic impedance of the artificial line. The line should be so designed that the voltage V2 developed across the terminating resistance will be co-phased with the given voltage V1 applied as input. The amplitude of the voltage V2 developed across the terminating resistance will be a delayed version of that of the given voltage V1 on a reduced scale, but with constant time lag. This time lag, as stated above is to be equal to a whole number of periods of the applied alternating voltage, or an odd number of half periods if a phase-inverting mechanism is included in the path of one of the voltages. In order that this delayed and reduced voltage may be compared with the given input voltage, a potentiometer is connected across the input and a voltage is tapped off therefrom to represent the input voltage on the same reduced scale. If one side of the input voltage is earthed, as shown, the required voltage V3, i. e., the difference between V2 and a portion of V1 will be derived between the live end of the terminating resistance Ro and the tapping on the potentiometer R1 at the input end. This will usually require conversion into a voltage relative to earth, and may be effected by connecting between these points the primary of a tuned transformer, the secondary of which will provide the required output voltage and may have one side earthed. Alternatively, the voltage between these points may be reproduced as a voltage to earth by the method described in British patent application 9,054/44, and in the corresponding United States application No. 592,417, filed May 7, 1945.

The way in which a circuit such as that of Figure 1 serves to produce the desired result will be described with reference to Figures 2 and 3. Figure 2 shows voltage $v$ plotted against time $t$ and Figure 3 shows change of voltage $\delta v$ in a time interval $\delta t$ plotted against time.

Figure 2:
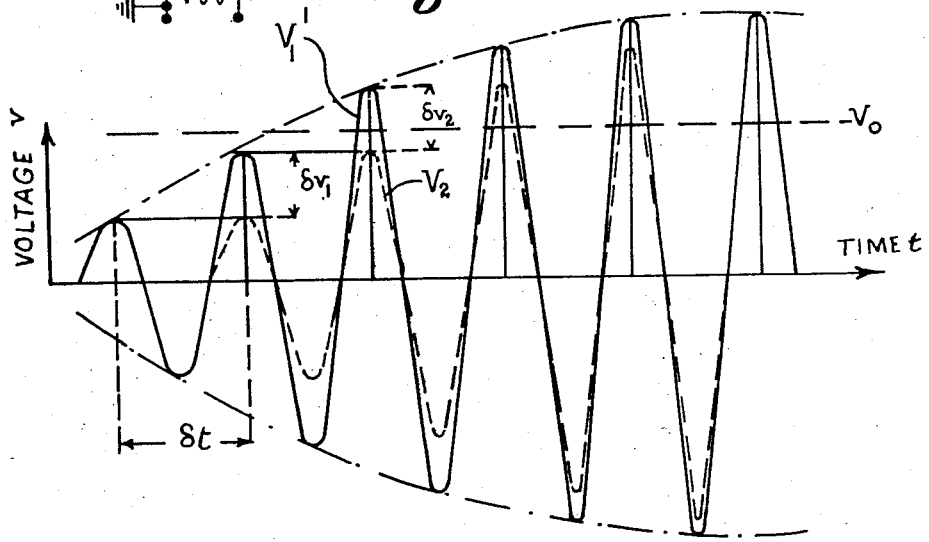
Figure 3:
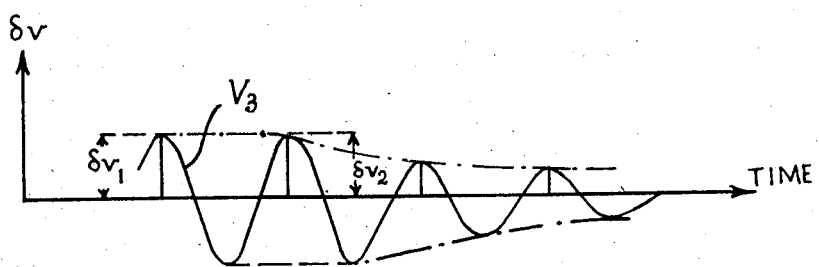

In Figure 2 there is shown in the full line curve a carrier oscillation V'1 (which is a part of V1) of period $\delta t$ modulated in amplitude. The modulation is such that in the first time interval $\delta t$ shown the increase in peak amplitude is $\delta v1$ and in the second interval it is $\delta v2$. Each of the peak values touches the envelope represented by the chain-dotted line and hence represents an instantaneous value of the envelope voltage which varies about some constant value $v_0$ which is, of course, the amplitude of the unmodulated carrier oscillation. It is desired to measure $\delta v/\delta t$ where $\delta v1$ and $\delta v2$ are particular values of $\delta v$.

In broken lines is shown an oscillation V2 identical with that in full lines but delayed in time by $\delta t$. The difference V3 between the full and broken line curves in Figure 2 is shown in Figure 3 in which the envelope shown in chain-dotted lines is approximately the differential of the envelope of Figure 2. The larger the ratio of the frequency of the carrier oscillation to the frequency of recurrence of variation in the modulation, the more nearly does the envelope of Figure 3 represent the differential of that in Figure 2.

If the modulated wave forms V'1 and V2 shown in Figure 2 can be regarded as sinusoidal, as they can with little error when the carrier frequency is relatively high, then the full line curve V3 of Figure 3 is also a sine wave of the same frequency since it represents the difference between two sine waves of the same frequency and phase.

When $\delta v/\delta t$ is negative the envelope of Figure 3 crosses the zero line, the positive part becoming negative and the negative part becoming positive. When the sign of $\delta v/\delta t$ is material, the ambiguity of sign can, of course, be removed in known manner by superimposing upon the oscillations of Figure 2, and hence upon that of Figure 3, an oscillation of constant amplitude and of the same frequency and phase as the carrier oscillation.

Where, as in Figure 1, a constant time delay is imposed between both the carrier and the side bands of the oscillation V2 relatively to V1, in order to obtain a difference oscillation V3 which is co-phased with V1 and V2 it is necessary that the time delay should be equal to a whole number of periods (assuming no phase-inverter is present).

We claim:

1. Apparatus for obtaining from a first alternating voltage of variable amplitude and constant frequency a second alternating voltage having the same frequency and substantially the same phase as the first alternating voltage and having an amplitude proportional to the rate of change of amplitude of the first alternating voltage, said apparatus comprising delay means for producing a delayed co-phased copy of the said first alternating voltage and means for deriving the difference between the said first alternating voltage and the said delayed co-phased copy, said delay means comprising a network formed of a plurality of cascade-connected sections, each section introducing a time delay in said alternating voltage.

2. Means for obtaining from a first alternating voltage of variable amplitude and constant frequency a second alternating voltage having the same frequency and substantially the same phase as the first alternating voltage and having an amplitude proportional to the rate of change of amplitude of the first alternating voltage, said means comprising a uniformly loaded delay line having the said first alternating voltage applied to one end of it and the other end of it terminated by a resistance equal in value to the characteristic impedance of the delay line, a potential divider connected across the input to said delay line, and a utilization circuit connected between the output of the delay line and a tapping on the potential divider.

3. In combination, a variable amplitude and fixed frequency signal source, a uniformly loaded delay line connected across said source and having a high resistance connected across the end thereof, a voltage divider spanning said signal source, and an output circuit for yielding the difference between the voltages developed across said resistance and across a fractional part of the voltage divider.

4. Means according to claim 2, wherein said delay line comprises a plurality of cascade-connected sections each including series inductance and shunt capacitance.

5. Means according to claim 2, wherein said utilization circuit includes a transformer tuned to said frequency.

LESLIE HERBERT BEDFORD.
LIONEL JOFEH.

REFERENCES CITED

The following references are of record in the file of this patent:

UNITED STATES PATENTS

| Number | Name | Date |
| --- | --- | --- |
| 1,435,009 | Kellogg et al. | Nov. 7, 1922 |
| 2,217,957 | Lewis | Oct. 15, 1940 |
| 2,236,134 | Gloess | Mar. 25, 1941 |
| 2,377,903 | Rieber | June 12, 1945 |
| 2,437,313 | Bedford | Mar. 9, 1948 |
| 2,437,951 | Godet | Mar. 16, 1948 |
| 2,439,198 | Bedford | Apr. 6, 1948 |
| 2,450,352 | Piety | Sept. 28, 1948 |